United States Patent [19]

Farrell et al.

[11] 4,297,813
[45] Nov. 3, 1981

[54] MULTIPLE LAYER INSULATION COVER

[75] Inventors: James J. Farrell, Livingston Manor; Anthony J. Donohoe, Ovid, both of N.Y.

[73] Assignee: Cornell Research Foundation, Inc., Ithaca, N.Y.

[21] Appl. No.: 110,575

[22] Filed: Jan. 9, 1980

[51] Int. Cl.³ .................. E04B 1/345; A01G 9/00
[52] U.S. Cl. .................................... 52/2; 47/17
[58] Field of Search ............... 52/404, 405, 406, 2; 47/17

[56] References Cited

U.S. PATENT DOCUMENTS

| | | | |
|---|---|---|---|
| 1,890,418 | 12/1932 | Schmidt | 52/407 |
| 2,750,313 | 6/1956 | Schwartz | 52/406 |
| 2,934,465 | 4/1960 | Warp | 52/406 |
| 3,741,631 | 6/1973 | Laing | 52/2 |
| 4,038,788 | 8/1977 | Classens | 52/2 |
| 4,040,210 | 7/1977 | Land | 52/2 |
| 4,064,648 | 12/1977 | Cary | 47/17 |
| 4,098,035 | 7/1978 | Bessler | 52/2 |
| 4,114,325 | 9/1978 | Hochstein | 52/2 |
| 4,150,516 | 4/1979 | Wemyss | 52/643 |

FOREIGN PATENT DOCUMENTS 1302607  1/1973  United Kingdom ............. 52/2

OTHER PUBLICATIONS

Pneumatic Structures-A Handbook for Architect and Engineer, by Herzog, copyright 1976, pp. 27, 28.

Primary Examiner—John E. Murtagh
Attorney, Agent, or Firm—Jones, Tullar & Cooper

[57] ABSTRACT

A multiple layer insulation cover for preventing heat loss in, for example, a greenhouse, is disclosed. The cover is comprised of spaced layers of thin foil covered fabric separated from each other by air spaces. The spacing is accomplished by the inflation of spaced air bladders which are integrally formed in the cover and to which the layers of the cover are secured. The bladders are inflated after the cover has been deployed in its intended use to separate the layers of the foil material. The sizes of the material layers are selected to compensate for sagging across the width of the cover so that the desired spacing is uniformly maintained when the cover has been deployed. The bladders are deflated as the cover is stored thereby expediting the storage process and reducing the amount of storage space required.

7 Claims, 2 Drawing Figures

MULTIPLE LAYER INSULATION COVER

The Government has rights in this invention pursuant to USDA Grant No. 58-7B30-8-18 awarded through the U.S. Department of Energy.

FIELD OF THE INVENTION

The present invention is directed generally to an insulation cover, which is deployed and stored as desired. More specifically, the present invention is directed to a multiple layer insulation cover for a greenhouse. More specifically, the present invention is directed to a four layer insulation cover for a greenhouse in which the layers are spaced from each other by inflatable air bladders. The spaced layers of material in the insulation cover are preferably comprised of a metal foil such as aluminum which is secured to a polyester scrim. Spaced air bladders are incorporated in the cover and these bladders are inflated once the cover has been deployed to space the layers. The cover is stored on a suitably driven roll and as the cover is retracted onto the roll, the air bladders are deflated.

In use as a greenhouse insulation cover, the multiple layer cover is stored on a roll above the level of the growth in the greenhouse. When the sun sets in the evening, or at any other time such as an overcast day, the cover is deployed to prevent heat loss through the roof of the greenhouse. The air bladders, which are inflated after the cover has been deployed, act to separate the layers of the cover, thus created air spaces between the layers to form an effective insulation cover which retains heat in the greenhouse.

DESCRIPTION OF THE PRIOR ART

The rising costs of fuel have created a severe problem for the greenhouse industry. The structure of the greenhouse, which allows maximum sunlight during the day, also allows a great deal of heat to escape during the evening. Approximately 10,000 acres are presently under glass in the United States; and as the costs of fuel oil and other sources of energy increase rapidly, the greenhouse owner is quickly being pushed to the point where he cannot continue in operation.

The problem of heat loss in greenhouses has been recognized and the use of covers for greenhouses is known generally in the prior art. In one form, these covers are flexible transparent sheets which are secured to the roof of the greenhouse on the exterior thereof and are inflated by suitable means to provide an air space between the cover and the roof. Another device for cutting down on heat loss during the night is the use of insulating panels of materials such as expanded foams or the like. These panels are either cut to shape and put up in the evening and taken down in the morning or are arranged in a manner similar to venetian blinds so that they are opened during the day and closed at night.

A recent attempt at reducing greenhouse heat loss is shown in U.S. Pat. No. 4,064,648 to Charles C. Cary. The Cary patent is directed to an insulation system for greenhouses and the like and is comprised of a flexible sheet of material which is wound around a roll, is deployed at night, and is stored during the day. Rolls of this material are placed longitudinally along the length of the greenhouse and are unrolled across the greenhouse. The edges of the flexible sheet are disposed generally in a channel or box at either side and a cogged wheel assembly may be used to deploy the sheet. The Cary patent also discloses a system for opening the cover in response to snow accumulation on the roof of the greenhouse.

The use of various heat retaining structures and elements is also known generally in conjunction with building windows, swimming pools, and other such facilities. These structures are often in the form of solid panels which can be moved from a storage location to a use location by some suitable means. Alternatively, these structures may be a flexible sheet of material which is stretched or otherwise secured across the area to be protected.

SUMMARY OF THE INVENTION

It is an object of the present invention to provide a multiple layer insulation cover.

Another object of the present invention is to provide a multiple layer insulation cover in which the layers are maintained in spaced array by inflatable air bladders.

A further object of the present invention is to provide an insulation cover for use in a greenhouse.

Still another object of the present invention is to provide an insulation cover having a positive edge seal between the cover and a support track.

Yet a further object of the present invention is to provide a cover which is effective to reduce heat losses by convection, conduction, and radiation.

As will be set forth in greater detail in a description of a preferred embodiment, as set forth hereinafter, the multiple layer insulation cover in accordance with the present invention is comprised generally of four layers of metal foil secured to polyester scrim. The four layers are joined, along their longitudinal sides to inflatable air bladders. As the bladders are inflated, the multiple layers are caused to separate thereby creating air spaces between each layer. The longitudinal edges of the cover terminate in generally T-shaped strips which cooperate with supports such as PVC piping or the like having an axially extending slot. The top of the T-shaped strip is placed within the support piping with the leg of the T extending out through the slot in the pipe. Suitably spaced reels, driven by electric motors or the like, are placed at either end of the area in which the cover is to be deployed to move the cover between its stored and deployed positions.

In contrast with known greenhouse insulation covers which are in the form of solid sheets or panels, the multiple layer insulation cover in accordance with the present invention is flexible and can be stored on a roll when not in use. This facilitates the deployment of the cover in a short period of time with little effort. Furthermore, the stored cover takes a minimum amount of space, thus when used in a greenhouse, allowing full utilization of the space within the greenhouse.

As was discussed previously, a flexible greenhouse cover is shown generally in U.S. Pat. No. 4,064,648 to Cary. This patent shows a single or double layer cover with, in the double layer cover, the two layers being separated over their entire areas by air pressure. In contrast, the multiple layer insulation cover in accordance with the present invention is formed of spaced layers with the spacing being accomplished by inflatable air bladders along the edges of the cover. These inflatable bladders allow the equal spacing of the four layers. Spacing of more than two layers could not be obtained with the Cary device unless the pressures between the layers were accurately controlled. By inflating only elongated tubes instead of the total area between the cover layers, the size of the blowers required can be reduced, thus reducing initial cost and operating expense. Additionally, the tubes are more rapidly inflated and deflated to facilitate deployment and storage of the cover.

In the cover set forth in the Cary patent, there are provided a plurality of separate covers, each of which extends transversely across the greenhouse. Contrastingly, in the multiple layer insulation cover of the present invention, the cover extends longitudinally along the length of the greenhouse. This type of deployment greatly reduces the length of the edges that must be sealed to prevent escape of heated air. Each longitudinal edge of the cover of the present invention ends in a T-shaped strip which rides in a support such as a hollow tube having an axially extending slot. The cooperation between the top of the T-shaped element and the hollow support, forms a positive seal which prevents escape of heated air. The short transverse ends of the cover can be sealed by any suitable means and this is a small area to seal in contrast to the longitudinal edges.

The material used to construct the multiple layer insulation cover in accordance with the present invention is preferably a flexible metal foil adhered to a polyester scrim. This material is readily available commercially, is easy to work with, is durable, and is not expensive. Thus, the cover which is produced is also long wearing and durable. Its initial cost and upkeep costs are low in comparison to the cost of heating fuels so that the costs of installing and operating an assembly using the multiple layer insulation cover of the present invention are attractive to the owner of a greenhouse or the like.

Since the materials used in the construction of the cover are durable and highly flexible, the cover can be rolled on a storage roller and will require little space. Repeated deployment and storage of the multiple layer insulation cover, as would be required in day to day usage, will not cause the materials to wear out rapidly, thus assuring the owner of the facility in which the cover is used of having an effective, durable and trouble free cover which is easily and rapidly deployable to prevent heat losses and to thereby substantially reduce fuel costs in a greenhouse, warehouse, or any similar area having heat loss problems.

BRIEF DESCRIPTION OF THE DRAWINGS

While the novel features of the multiple layer insulation cover in accordance with the present invention are set forth with particularity in the appended claims, a full and complete understanding of the present invention may be had by referring to the description of a preferred embodiment as set forth hereinafter and as seen in the accompanying drawings in which:

DESCRIPTION OF A PREFERRED EMBODIMENT

Figure 1:
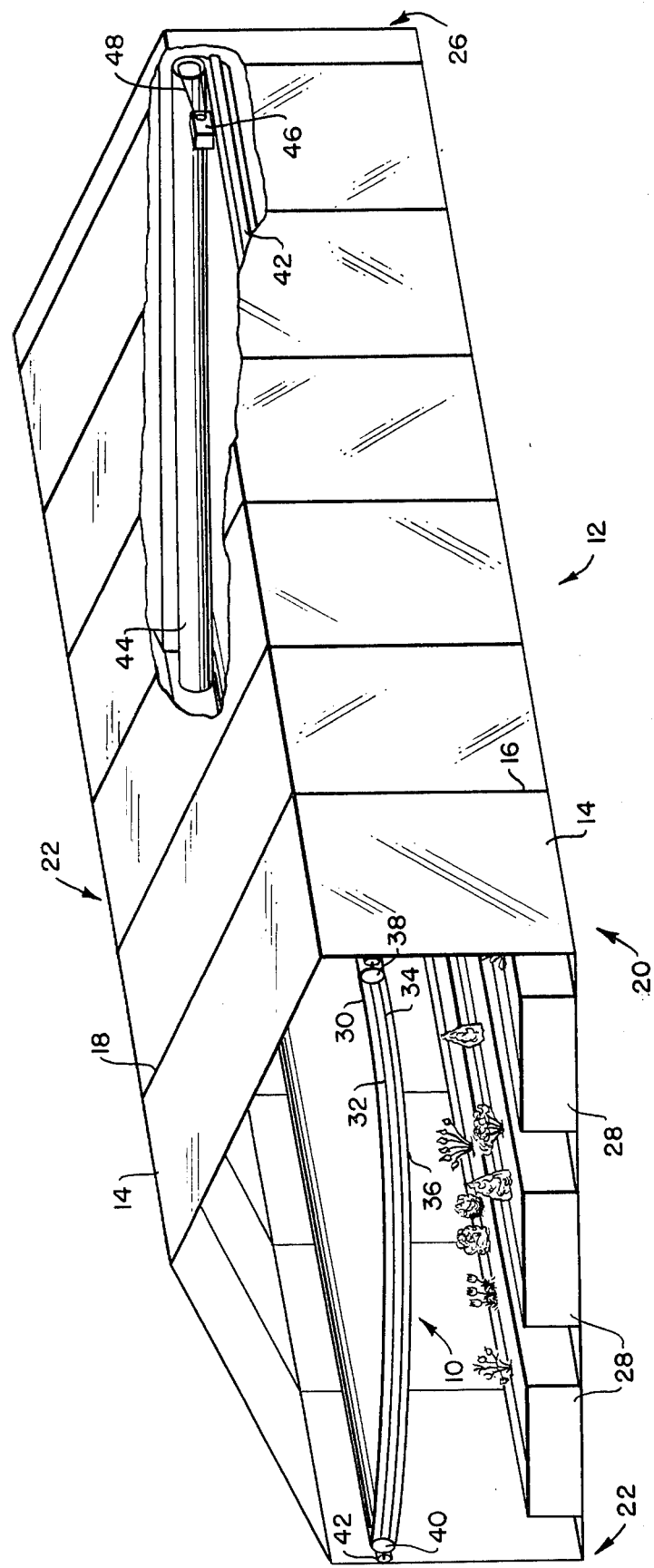
FIG. 1 is a schematic perspective view, partly in section, and with portions removed for clarity of a multiple layer insulation cover in accordance with the present invention, the cover being deployed in a greenhouse.

Turning initially to FIG. 1, there may be seen generally at 10, a multiple layer insulation cover in accordance with the present invention. In the preferred embodiment, cover 10 is shown deployed in a conventional greenhouse, generally at 12. While the cover 10 will hereinafter be discussed and described in conjunction with a greenhouse, it is to be understood that the invention is not limited to such use. The multiple layer insulation cover in accordance with the present invention can be used advantageously in any area where it is desired to reduce heat loss. By way of example, the cover could be utilized in a warehouse to substantially reduce heat loss through a poorly insulated roof. Similarly, in a passive solar house with south facing windows, the cover in accordance with the present invention could be used to cover the windows when there is no sunlight thereby substantially reducing heat loss. Accordingly, while the multiple layer insulation cover will be hereinafter described in use in a greenhouse, its uses are not so limited.

As may be seen in FIG. 1, greenhouse 12 is of conventional construction and has a plurality of transparent panels 14 which are supported by spaced uprights 16 and roof trusses 18 to form greenhouse structure 12 which has spaced longitudinally extending walls 20 and 22 and a peaked roof 24. One end wall 26 of greenhouse 12 may be seen at the right of FIG. 1 and it will be understood that the greenhouse would be closed with a second end wall which, for clarity, is not shown. It will also be understood that greenhouse 12 could be shaped generally as a hemicylinder or other known shape. Greenhouse 12 is also provided with a plurality of spaced benches or supports 28 upon which the plants being grown are placed.

Multiple layer insulation cover 10 is comprised, as may be seen in FIG. 1, of four spaced layers 30, 32, 34, and 36, which extend between the side walls 20 and 22 of greenhouse 12 and which terminate in inflatable air bladders 38 and 40, which, as will be described in greater detail hereinafter serve to separate the layers 30–36 when inflated. The cover 10 extends longitudinally along the length of the greenhouse 12 and is secured to the walls 20 and 22 by support tubes 42 which are connected to the spaced uprights 16, as will be described hereinafter. A storage reel 44 is shown supported at the first end 26 of greenhouse 12 by conventional means. Reel 44 extends transversely across the greenhouse side walls 20 and 22 and is rotatable by a suitable power source such as an electric motor 46 which transmits power to reel 44 through a drive belt 48 or the like. It will be understood that there is also provided a corresponding deployment reel assembly (not shown) which would be placed adjacent a second end wall of greenhouse 12 and would be similar in structure and operation to reel 44. Actuation of the deployment reel assembly would cause cover 10 to be deployed in place, as seen in FIG. 1, while actuation of the storage reel assembly 44 would store cover 10, thus permitting sunlight to pass through the transparent panels 14 to contact the growing plants.

Figure 2:
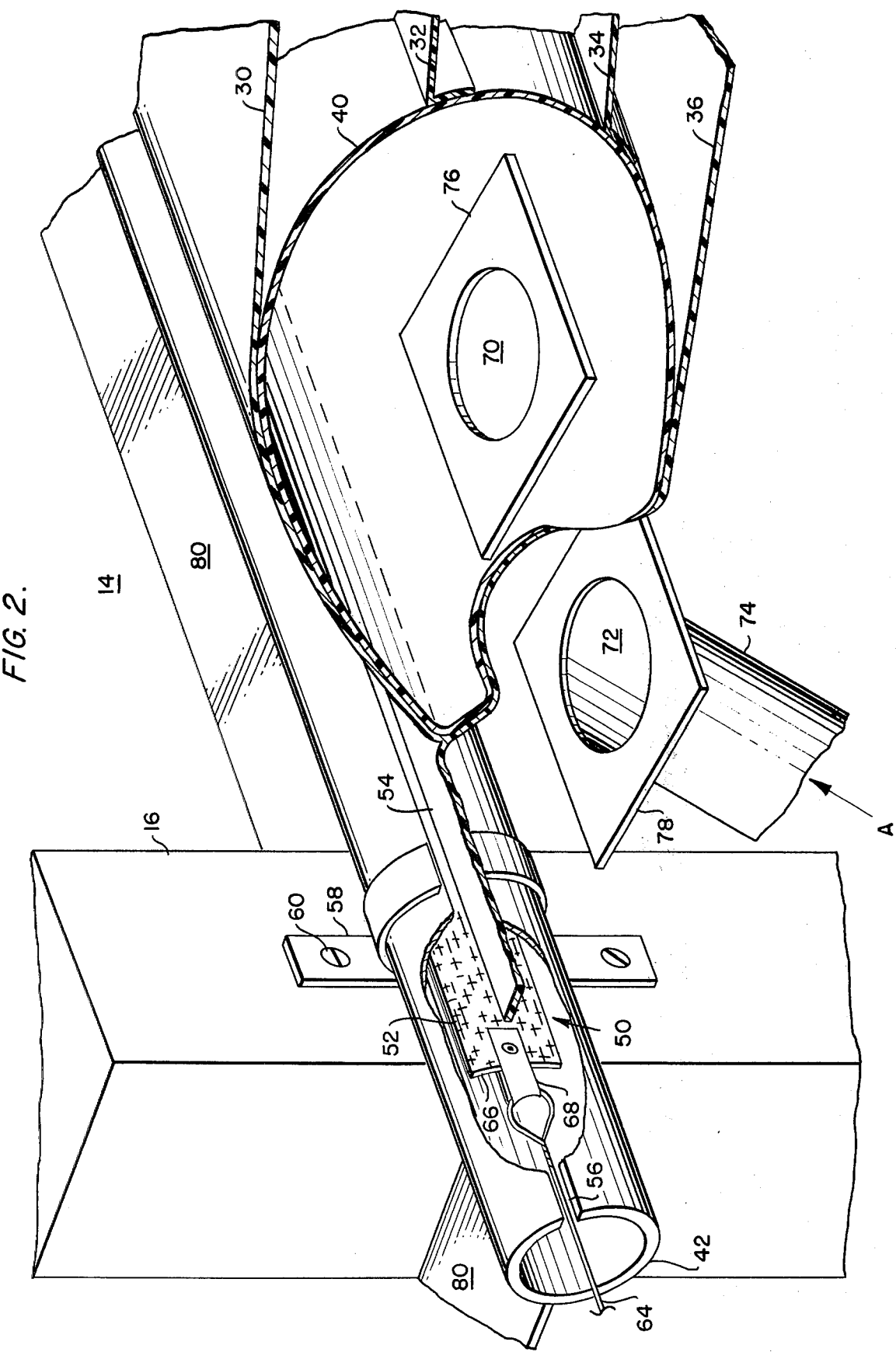
FIG. 2 is a perspective view, partly in section, showing a portion of a multiple layer insulation cover in accordance with the present invention.

Turning now to FIG. 2, there may be seen an enlarged view of a portion of multiple layer insulation cover 10 in accordance with the present invention. As was discussed previously, cover 10 is formed by four layers 30, 32, 34 and 36 which are spaced by an air bladder 40. As may be seen in FIG. 2, top and bottom layers 30 and 36, respectively of cover 10 are coextensive with a portion of bladder 40. Upper and lower intermediate layers 32 and 34 are secured to the outer periphery of bladder 40 at spaced locations by any acceptable means or method such as stitching or an adhesive. Bladder 40 is formed of the same material as the four spaced layers and may be suitably treated to retain air under pressure or may carry an air tight plastic inner liner (not shown). The material used in the fabrication of the multiple layer insulation cover 10 is, as was discussed previously, an aluminum foil secured to a polyester scrim. A suitable material is FOYLON and is available from the Duracote Corporation.

The top and bottom layers 30 and 36 and bladder 40 terminate, at their outer edge in a generally T-shaped strip or element 50. Strip 50 includes a top piece 52 and a leg 54 which cooperate to form the T. As may be seen in FIG. 2, strip 50 is disposed with its top 52 within the support pipe 42 and with leg 54 passing through an axial slot 56 in pipe or support track 42. This slot 56 may be angled downwardly with reference to a horizontal plane thereby reducing wear on the underside of leg 54 of T-strip 50. In a preferred embodiment in which the span between side walls 20 and 22 is approximately 24 feet, the slot 56 may be angled downwardly at approximately 9°.

Support 42 is shown in the preferred embodiment as PVC piping and this is preferred since it is lightweight, durable, impervious to moisture, and the like, easily installed, and not particularly expensive. It will be understood that other materials could be used for support 42 if necessary. Support 42 is secured to the spaced uprights 16 by any suitable means such as brackets 58 which are held in place by screws 60 or the like.

A cable 64 such as wire rope or the like is secured to a leading edge portion 66 of T-strip 50 by a suitable U-shaped connector 68. Cable 64 runs through the support tube 42 and is secured to the deployment reel (not shown). Actuation of the deployment reel causes the cable 64 to pull the cover off the storage reel 44. It will be understood that a similar cable would be provided in the other support tube secured to the other side wall of greenhouse 10 and that additional cables could be secured at spaced points across the leading edge of the multiple layer insulation cover. It will also be understood that the leading edges of layers 30, 32, 34, and 36 and of bladders 38 and 40 are all sealed together.

As the cables 64 are wound on the deployment reel, the multiple layer insulation cover 10 is pulled off storage reel 44 and is deployed above the growing area of greenhouse 12, as seen in FIG. 1 at a desired height sufficient to allow access to the plants or benches 28. The leg portion 54 of T-strip 50 passes through the slot 56 in the support pipe 42 and the top portion 52 of strip 50 seals the slot 56 to form an effective air seal. As the cover 10 reaches the deployed portion, an air opening 70 in the lower side of bladder 40 is placed over a corresponding outlet 72 in an air conduit 74. Correspondingly shaped, magnetized flexible gaskets 76 and 78 are provided with gasket 76 surrounding air opening 70 in bladder 40 and with gasket 78 being secured about outlet 72 of air conduit 74. Air is provided by a blower or fan (not shown) and is directed up conduit 74 in the direction indicated by arrow A in FIG. 2. This air flow is sufficient to inflate bladder 40 to a shape as shown in FIGS. 1 and 2. It will be understood that the bladder along the other longitudinal edge of cover 10 is being concurrently inflated to deploy the cover with the four layers generally uniformly spaced.

Once multiple layer insulation cover 10 is deployed and the bladders 38 and 40 are inflated, there is provided an effective means for retaining heat in the greenhouse. The four layers 30, 32, 34, and 36 are assembled in cover 10 with the reflective side facing upwardly. The air spaces between layers stop conductive heat loss, the air spaces are still so there is little convective heat loss and the aluminum foil is a poor emitter of heat so there is little radiant heat loss. With the cover 10 deployed, the heat remains in the greenhouse. There is little heat loss due to poor sealing since the T-strip 50 and support tube 42 form an effective seal. As may be seen in FIG. 2, the spaces between the uprights 16, transparent panels 14 and support tube 42 can be sealed by suitable strips 80 of insulation such as expanded foam which are permanently secured in place. Suitable means such as suspended drapes or flaps can be provided along the end walls of the greenhouse to prevent escape of heated air around the reels.

In a preferred embodiment, in which the width of the greenhouse is 24 feet, the air bladders 38 and 40 are structured to have a circumference of approximately 30 inches. Top and bottom layers 30 and 36 are in contact with bladder 40 each for approximately 14 inches and the intermediate layers 32 and 34 are spaced 2 inches from each other. This results in a multiple layer insulation cover in which each layer is spaced approximately 2 inches from the next layer. The air supplied to bladders 38 and 40 is only slightly above atmospheric pressure by approximately 0.6 inches of water. A small fan capacity is required and a fan which provides 50 CFM and draws only 50 watts of power will be adequate to inflate a bladder in several minutes. Since the layers of cover 10 are very light, the force of each layer on the bladder is small and would be in the order of 0.089 Lb/in over a 24 foot span with a 12 inch sag at the center of the span. By suitable analysis, the length of material to be used to form the four layers can be selected prior to assembly so that the spacing will remain uniform across the entire span. It will be understood that the use of bladders 38 and 40, the air pressure required, and the amount of sag across the span can be varied depending on the size of the span. It will also be understood that the size of the fans can be varied depending on how rapidly it is desired to inflate the bladders. Additionally, plural fans can be placed along the length of each bladder. Since these fans draw little power, they will be left on when the cover is deployed thereby insuring inflation of the bladders and spacing of the layers even if there are minor air leaks.

When the cover 10 is to be stored, the fans are turned off and the storage reel 44 is actuated to draw the cover 10 to the right, as seen in FIG. 1. The air is forced out of the bladders and the T-strips 50, which are made of nylon webbing or other similar material, are sufficiently flexible so that the top 52 folds adjacent the leg 54 once the T-strip is pulled out of the support 42 adjacent take-up reel 44. The rolling of the cover 10 in this fashion reduces wear to a minimum and stores the cover in as little space as possible.

The multiple layer insulation cover in accordance with the present invention as set forth hereinabove is an effective, economical, and dependable way of greatly reducing heat loss through the roof of a greenhouse or through any other poorly insulated area. The multiple layers of the cover provide good insulation capabilities without bulk and with little storage space requirement. The longitudinally extending air bladders facilitate the spacing of the layers in an effective and economical manner while not requiring large capacity fans or blowers.

While a preferred embodiment of a multiple layer insulation cover in accordance with the present invention has been set forth hereinabove, fully and completely, it will be obvious to one of ordinary skill in the art that a number of changes in, for example, the number of layers, the type of fabric, the drive means for the reels, the shape of the support tubes, and the like, could be made without departing from the true spirit and scope of the invention and that the invention is to be limited only by the following claims:

We claim:

1. A multiple layer insulation cover for preventing heat losses from the interior of a building, said cover comprising:
   a. four layers of flexible cloth backed metal foil;
   b. first and second elongated air bladders in said cover spaced from each other and extending along longitudinal edges of said cover, said layers of said cover being spaced apart from each other by inflation of said bladders;
   c. support tubes extending along the interior of the building, said tubes including axially extending slots and supporting said cover as said cover is deployed in said building;
   d. T-shaped strips secured to outer edge portions of said cover adjacent said air bladders, said T-shaped strips cooperating with said support tubes to support said cover;
   e. means for inflating said air bladders when said cover is deployed to space said layers; and
   f. means to move said cover between deployed and storage positions.

2. A multiple layer insulation cover adapted for use in preventing escape of heat from the interior of a building, said cover comprising:

at least three spaced, flexible layers joined together along first and second spaced, parallel edge portions to form said cover, said cover extending transversely across the interior of the building, spaced from, and generally parallel to, a floor portion of the building;

first and second elongated air bladders in said cover, said bladders being secured in said cover adjacent said first and second edge portions of said cover, respectively and being inflatable to space said layers of said cover;

means for maintaining said spaced layers of said cover at a uniform distance from each other while allowing said cover to sag transversely;

support means securing said edge portions of said cover to side walls of the building, said support means including axial slots through which said edge portions extend, said support means being mounted so that said axial slots are angled downwardly with respect to the floor of the building; and means for slidably securing said edges in said support means.

3. The cover of claim 2 wherein said support means are tubes, said tubes being secured to said building.

4. The cover of claim 2 wherein said means for slidably securing said edge portions in said support means are T-shaped strips secured to edge portions of said cover, a head portion of each said T-shaped strip being carried in said support means and a leg portion of each said T-shaped strip extending through said axial slot and being secured to said cover.

5. The cover of claim 4 further including means to deploy and store said cover.

6. The cover of claim 5 wherein said means to deploy and store said cover are spaced reels, said cover being movable between stored and deployed positions by actuation of said reels.

7. The cover of claim 6 wherein said T-shaped strips are flexible, said head portion folding into coincidence with said leg portion during storage of said cover.

* * * * *